United States Patent
Blaser

(10) Patent No.: US 11,870,285 B2
(45) Date of Patent: Jan. 9, 2024

(54) SYSTEMS AND METHOD FOR ELECTRONICALLY DISCONNECTING BATTERIES

(71) Applicant: Mobile Tech, Inc., Hillsboro, OR (US)

(72) Inventor: Robert Logan Blaser, Farmington, UT (US)

(73) Assignee: Mobile Tech, Inc., Hillsboro, OR (US)

( * ) Notice: Subject to any disclaimer, the term of this patent is extended or adjusted under 35 U.S.C. 154(b) by 302 days.

(21) Appl. No.: 17/066,693

(22) Filed: Oct. 9, 2020

(65) Prior Publication Data
US 2021/0111569 A1    Apr. 15, 2021

Related U.S. Application Data

(60) Provisional application No. 62/912,738, filed on Oct. 9, 2019.

(51) Int. Cl.
| | |
|---|---|
| *H02J 7/00* | (2006.01) |
| *G06F 1/16* | (2006.01) |
| *G06F 1/3212* | (2019.01) |
| *G06F 1/28* | (2006.01) |
| *G08B 13/14* | (2006.01) |

(52) U.S. Cl.
CPC .......... *H02J 7/0031* (2013.01); *G06F 1/1632* (2013.01); *G06F 1/28* (2013.01); *G06F 1/3212* (2013.01); *G08B 13/1418* (2013.01); *H02J 7/0048* (2020.01)

(58) Field of Classification Search
CPC ...... H02J 7/0031; H02J 7/0048; H02J 7/0032; G06F 1/1632; G06F 1/28; G06F 1/3212; G06F 1/263; G08B 13/1418
See application file for complete search history.

(56) References Cited

U.S. PATENT DOCUMENTS

| | | | |
|---|---|---|---|
| 6,271,605 B1 * | 8/2001 | Carkner | H02J 7/0031 307/140 |
| 6,486,636 B1 * | 11/2002 | Stolitzka | H02J 7/0048 320/128 |
| 6,646,845 B1 * | 11/2003 | Turner | H02J 9/002 320/148 |
| 10,592,862 B1 * | 3/2020 | Strom | G06Q 10/087 |

(Continued)

FOREIGN PATENT DOCUMENTS

| | | | | |
|---|---|---|---|---|
| CN | 105607981 A | * | 5/2016 | ............ H02J 7/0031 |
| CN | 214310816 U | * | 9/2021 | ......... G01R 31/3835 |

(Continued)

*Primary Examiner* — Stacy Whitmore

(57) ABSTRACT

Methods and systems that selectively controls whether a battery is electronically connected to or disconnected from operational circuitry of an electronic device are described. The switching circuitry electronically connects the battery with operational circuitry in response to external electric power being available to the operational circuitry, thereby allowing the battery to be available as a backup source of electrical power for the operational circuitry when external electric power is lost. Methods and systems also electronically disconnect the battery from the operational circuitry in response to a loss of external electric power to the operational circuitry. As a result, undesirable battery drainage is avoided if the device is left in storage or is not being used for an extended period of time.

17 Claims, 7 Drawing Sheets

(56) References Cited

U.S. PATENT DOCUMENTS

| | | | |
|---|---|---|---|
| 11,270,561 B1* | 3/2022 | Kelsch | G08B 13/1481 |
| 2011/0187531 A1* | 8/2011 | Oehl | G08B 13/22 |
| | | | 340/568.1 |
| 2012/0322380 A1* | 12/2012 | Nannarone | G08B 21/0275 |
| | | | 455/67.11 |
| 2015/0091729 A1* | 4/2015 | Phillips | G08B 13/149 |
| | | | 340/568.2 |
| 2015/0248150 A1* | 9/2015 | Kuo | G06F 1/1632 |
| | | | 713/300 |
| 2016/0058206 A1* | 3/2016 | Schwalbach | A47F 3/085 |
| | | | 361/752 |
| 2016/0126785 A1* | 5/2016 | Min | H02J 7/0048 |
| | | | 307/64 |
| 2016/0203455 A1* | 7/2016 | Hicks | G06Q 20/204 |
| | | | 235/449 |
| 2018/0349651 A1* | 12/2018 | Snediker | G08B 13/14 |
| 2019/0222035 A1* | 7/2019 | Zhu | H02J 7/00309 |
| 2020/0005611 A1* | 1/2020 | Taylor | H04B 3/56 |
| 2020/0090175 A1* | 3/2020 | Davis | H04W 4/021 |
| 2020/0252430 A1* | 8/2020 | Peacock | H04W 12/126 |
| 2022/0216712 A1* | 7/2022 | Zhu | H02J 7/00309 |

FOREIGN PATENT DOCUMENTS

| | | | | |
|---|---|---|---|---|
| CN | 214577377 U | * | 11/2021 | |
| WO | WO-2016069256 A1 | * | 5/2016 | G08B 13/1427 |
| WO | WO-2016210069 A1 | * | 12/2016 | G08B 13/149 |
| WO | WO-2020163486 A1 | * | 8/2020 | G06F 21/51 |
| WO | WO-2020227513 A1 | * | 11/2020 | A47F 3/00 |

\* cited by examiner

SYSTEMS AND METHOD FOR ELECTRONICALLY DISCONNECTING BATTERIES

CROSS REFERENCE TO RELATED APPLICATION

This application claims the benefit of Provisional Application 62/912,738, filed Oct. 9, 2019.

TECHNICAL FIELD

The present disclosure is directed to extending the life span of a battery of an electronic device.

BACKGROUND

Many electronic devices with internal rechargeable batteries suffer from battery degradation over time, whether the batteries are used for primary power or for back-up power with respect to operation of the devices. This can be a particularly acute problem for devices where the batteries are costly and challenging to replace. If such a device with an internal battery remains in inventory or is otherwise unused for an extended period of time, battery drainage occurs, leaving the battery with little or no charge for an extended period of time, which degrades the battery performance and significantly reduces the life span of the battery.

Examples of devices that include internal batteries to provide backup power in case primary power is lost include retail security positions for securely merchandising products to customers and docking systems for portable computing devices. The internal batteries of security positions and docking systems tend to discharge quickly. With conventional retail security positions and docking systems the internal batteries typically remain at low charge levels for long periods of time because the retail security positions, and docking systems are often not connected to power. As a result, the internal batteries of conventional security positions and docking systems are degraded.

SUMMARY

Systems and methods described herein are directed to improving the life span of batteries of electronic devices. In one aspect, methods and systems are implemented with switching circuitry that selectively controls whether a battery is electronically connected to or disconnected from operational circuitry of an electronic device. The switching circuitry electronically connects the battery with operational circuitry in response to external electric power being available to the operational circuitry, thereby allowing the battery to be available as a source of backup electrical power for the operational circuitry when external electric power is lost. The switching circuitry also electronically disconnects the battery from the operational circuitry in response to external electric power not being available for the operational circuitry. As a result, undesirable battery drainage is avoided if the device is left in storage or is not being used for an extended period of time.

DETAILED DESCRIPTION

Figure 1A:
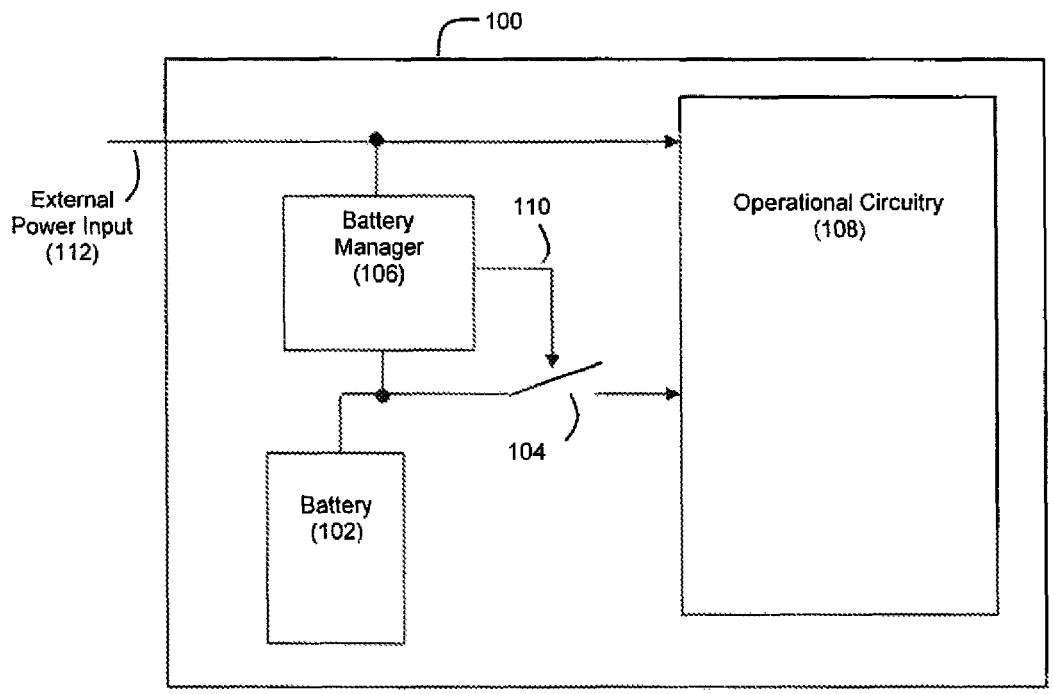
FIGS. 1A and 1B show example devices where a battery manager selectively connects and disconnects a battery from operational circuitry.
Figure 1B:
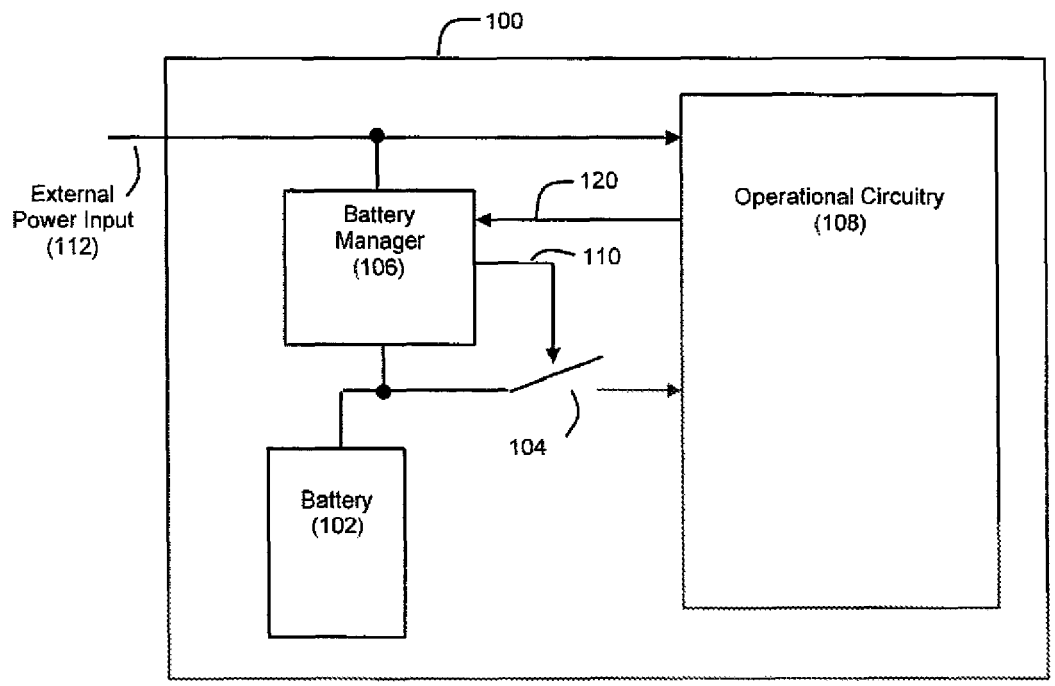

FIG. 1A shows an example electronic device 100 that includes an on-board battery 102, an electronic switch 104, a battery manager 106, and operational circuitry 108. The battery 102 can be a re-chargeable battery. The battery manager 106 selectively opens and closes the switch 104 based on whether defined criteria described below are satisfied. When electronic switch 104 is closed, the operational circuitry 108 is electronically connected to the battery 102. When electronic switch 104 is open as shown in FIGS. 1A and 1B, the operational circuitry 108 is electronically disconnected from the battery 102. The battery manager 106 controls the open or closed state of the switch 104 via a control signal 110. Switch 104 can take any of a number of forms. For example, the switch 104 may be a transistor switch, such as an NFET or PFET transistor. As another example, the switch 104 may be a mechanical relay switch that is activated via control signal 110. As yet another example, the switch 104 may be a solid-state relay that is activated via control signal 110. The switch 104 may be any type of switching circuitry that is capable of being actuated to reduce the current draw by the operational circuitry 108 from the battery 102 to zero or near zero so that the battery 102 can last for extended periods such as many days, months, or years without substantial capacity drain due to leakage of current.

The operational circuitry 108 can be any circuitry that is used by the device 100 to perform one or more device functions that rely on electrical power. For example, the device 100 may be a computer system in which the operational circuitry 108 may include one or more processors, data storage devices, memory, ports, and network connections. As yet another example, the device 100 may be a display device in which the operational circuitry 108 may include one or more video processors, data storage, memory, ports, and network connections. As yet another example, the device 100 may be a retail security position and the operational circuitry 108 may include security circuitry, such as circuitry that triggers an alarm when an unauthorized removal or disconnection of a product from the retail security position occurs. As another example the device 100 may be a retail security position and the operational circuitry 108 may include network connectivity circuitry, such as circuitry that provides wireless connectivity with a remote computer system for sending or receiving data wirelessly. As yet another example, the device 100 may be a docking system and the operational circuitry 108 may include security circuitry, such as circuitry that triggers an alarm when an unauthorized removal or disconnection of a case mount for the docking system from a base mount for the docking system occurs or an unauthorized removal or disconnection of a portable computing device from the case mount occurs.

As another example with respect to an example embodiment where the device 100 is a docking system, the operational circuitry 108 may include signal processing circuitry, such as circuitry that passes data between the case mount and base mount or connects the docking system with external networks. In an example embodiment, the device operational circuitry 108 may include the circuitry for performing all of the device 100's functions that rely on electrical power.

The device 100 can also include a power input 112 through which power is received from an external electric power source, such as a wall outlet. For example, the device 100 can be plugged into a wall outlet either directly or indirectly via a power adapter or power strip. The operational circuit 108 draws electrical power from the battery 102 or from external electric power input 112. The operational circuitry 108 may draw power from the power input 112 when external electric power is available and switch via operation of the switch 104 to draw power from the battery 102 as a backup when the external electric power is lost.

The battery manager 106 can also draw power from the power input 112 when external electric power is available. When external electric power at the power input 112 is lost, the battery manager 106 can draw power from battery 102 for operational power. The battery manager 106 monitors the level of external electric power at the power input 112 and one or more other conditions to determine whether to open or close the switch 104.

In an example embodiment, the presence of external electric power at the power input 112 can be the primary criterion for closing the switch 104. For example, when external electric power is present at the power input 112, the battery manager 106 generates the control signal 110 that closes the switch 104. In other words, the battery 102 is available as backup power for the operational circuitry 108 should backup power be needed. When external electric power is lost at the power input 112, the battery manager 106 can check one or more secondary criteria described below to determine whether the switch 104 should be opened or closed.

Any of a number of secondary criteria may be used by the battery manager 104 to control opening or closing of the switch 104 when external electric power at the power input 112 is lost. Secondary criteria include commands sent to the battery manager 106 from one or more external sources. Secondary criteria include one or more internal conditions of the device 100 for opening or closing the switch 104. For example, the battery manager 106 may have circuitry and or logic that measures a battery charge level for the battery 102 and leaves the itch 104 closed while the battery 102 is used to power the operational circuitry 108. The battery manager 106 opens the switch 104 when the battery charge level falls below a charge threshold. As a result, the battery 102 can be electronically disconnected from the operational circuitry 108 when the battery charge level reaches a desired charge level for long term storage. For example, the charge threshold can be a value in the range of approximately 50-80% of the maximum charge capacity for the battery 102. In another example embodiment, the charge threshold can be a value in the range of approximately 60-70% of the maximum charge capacity for the battery 102. Thus, with this example, the device 100 can respond to a loss of external electric power at the power input 112 by opening the switch 104 when (1) a command has been received to open the switch 104 (e.g., see FIGS. 2A and 2B below), and (2) the battery charge level of the battery 102 is below the charge threshold. If the battery charge level is below the charge threshold when the command to open the switch 104 is received, the switch 104 is immediately opened. If the battery's charge level is above the charge threshold when the command is received, the battery manager 106 would wait to open the switch 104 until after the battery 102 has drained sufficiently to bring battery charge level below the charge threshold.

As another example, the battery manager 106 can include a delay element that operates to delay opening the switch 104 until after a time limit has passed since external electric power is lost at the power input 112. For example, the time limit could be a period such as 10 seconds, 30 seconds. 1 minute, 5 minutes, or 15 minutes. Such a delay could help reduce the risk of situations where the battery manager 106 might lose control over power input (which could potentially result in an unwanted "hibernation" state") in the event of transient losses in external electric power, such as momentary glitches, microprocessor reboots, firmware updates, etc. that might register as brief power losses.

As another example, the battery manager 106 can use one or more operational states of the device 100 as a trigger for one or more secondary criteria. In such a case, the device 100 can include one or more signal paths 120 from the operational circuitry 108 to the battery manager 106 for communicating data about the operational status of the device 100 (see FIG. 1B). For example, a security/alarm function of the device 100 may be armed, disarmed, and/or alarming when making a decision regarding whether to open or close switch 104. Accordingly, it should be understood that any combination of one or more operational states for the electronic device 100 as detectable by the operational circuitry 108 could be used by the battery manager 106 when making a decision whether to open or close the switch 104.

Figure 2A:
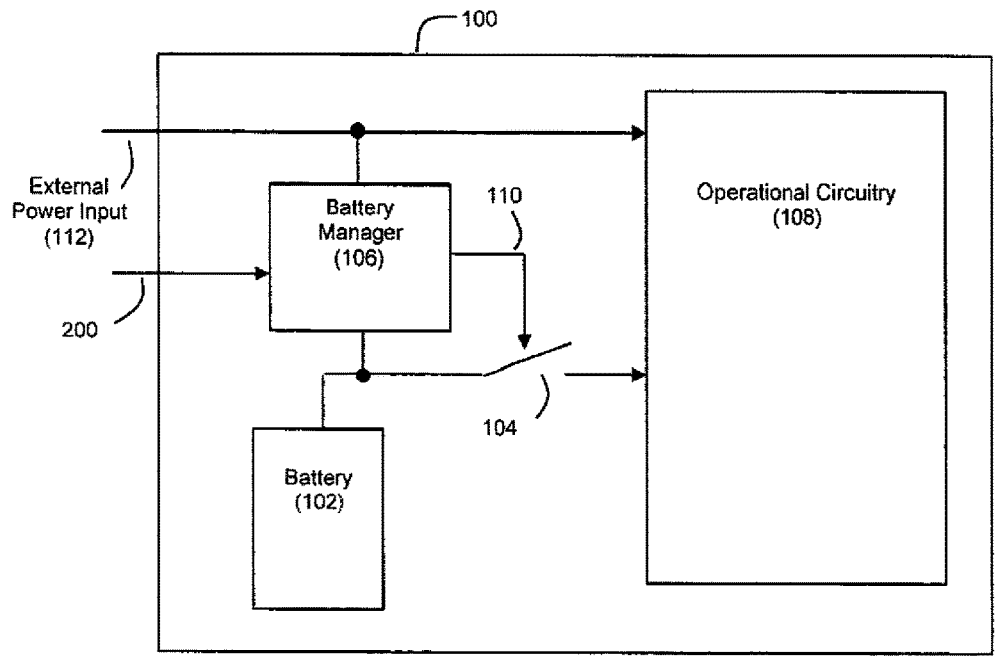
FIGS. 2A and 2B show examples of devices where a battery manager selectively connects and disconnects a battery from operational.

FIG. 2A shows an example where the device 100 includes an external user interface input 200 such as a push button, mechanical switch, or any logical level input, such as logical level inputs that could be controlled by shorted jumper pins, that can be actuated by a user to command the battery manager 106 to open switch 104. Thus, in an example where device 100 is to be moved into storage for an overnight period or other extended period, the user can disconnect device 100 from external electric power and also actuate input 200 to command the battery manager 106 to generate a control signal 110 that opens switch 104. This would disconnect the battery 102 from the operational circuitry 108 can thereby place the device 100 in a "storage mode" where battery capacity leakage via the operational circuitry 108 can be avoided. As an alternative to a push button or mechanical switch, the user interface input 200 may be an interface for a user fob such as an RFID card or other form of user authorization credentials, such as an RFID card reader or the like. As a result, a user can present an RFID card or the like to the user interface input 200, whereupon the authorization credentials of the RFID card are processed to determine whether the user is authorized to place device 100 in "storage mode." If authenticated, the battery manager 106 can then drive control signal 110 to open the switch 104.

Figure 2B:
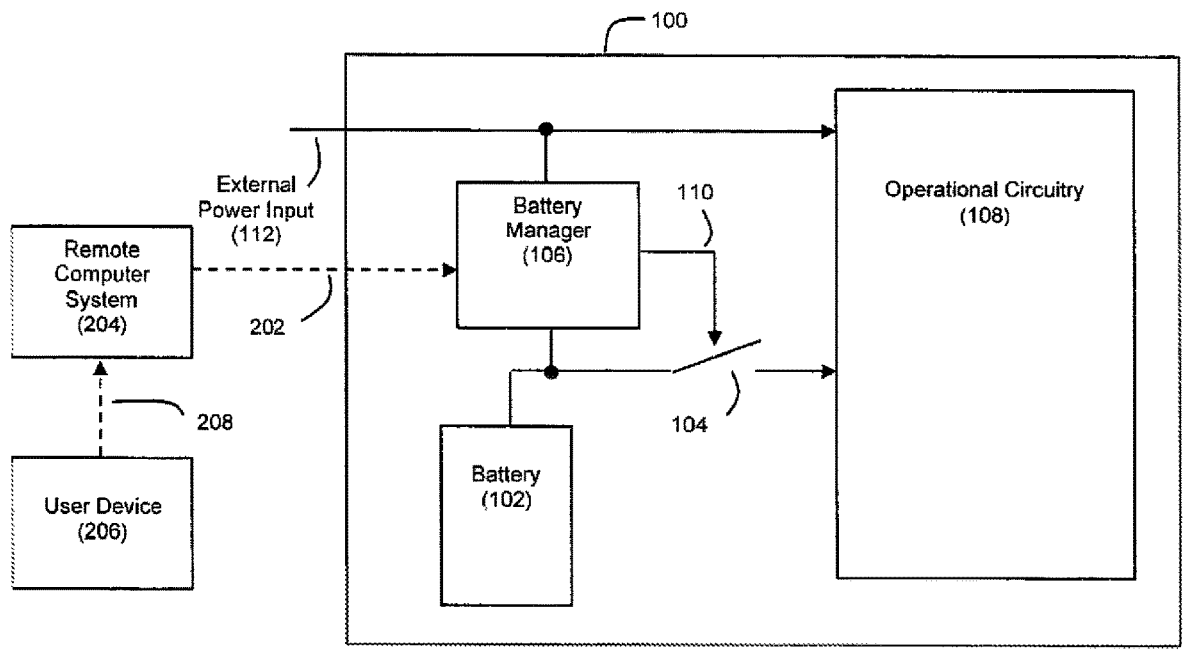

FIG. 2B shows an example where the device 100 includes a wireless interface 202 that provides wireless connectivity with a remote computer system 204. Remote computer system 204 can then wirelessly transmit a storage mode command to the battery manager 106. The battery manager 106 can respond to such a command by driving the control signal 110 to open the switch 104. Remote computer system 204 can send such a command to the device 100 in response to user action on a user device 206 such as a tablet computer, smart phone, laptop, or other computing device that is operable to wirelessly transmit a command 208 to the remote computer system 204.

However, it should be understood that other secondary criteria (or combinations of secondary criteria) could be implemented in the battery manager 106. For example, an external command 200 may not be used as a secondary trigger for opening the switch 104. As another example, only the time limit may be used as the secondary criterion, where the switch 104 would be opened when external electric power to the device 100 is lost for more than the time limit. For example, the time limit may be set to a relatively long value such as an hour or more in case there is an extended power lost and the device 100 is expected to run on backup power provided by the battery 102 for an extended period of time.

Figure 3:
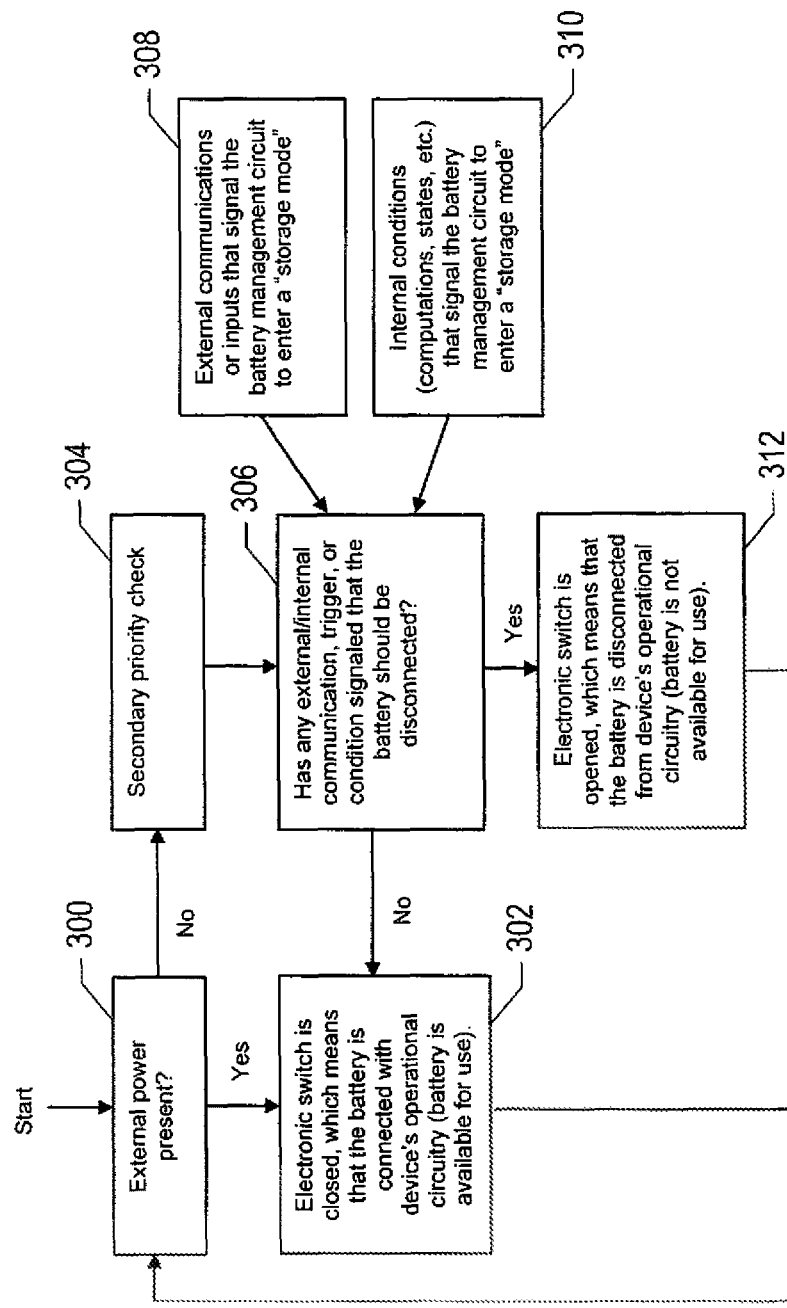
FIG. 3 shows an example process for controlling a switch of any of the devices shown FIGS. 1A, 1B, 2A, and 2B.

FIG. 3 is a diagram for operating the switch 104. At block 300, the battery manager 106 determines whether external electric power is present at power input 112 based on a voltage level at power input 112. When the voltage exceeds a defined threshold, the battery manager 106 determines that external electric power is present. Otherwise, the battery manager 106 determines that external electric power is not present. Any of a number of forms of circuitry can be used for detecting whether external electric power is present at power input 112. For example, the circuitry may be arranged to feed the voltage from power input 112 to a gate of the switch 104 to bias the switch 104 to a closed state. This voltage feed can be passed through a diode to provide isolation and a logical "OR" function. In another example, the circuitry may include a processor that reads the voltage level at power input 112 and determines whether power is present based on the voltage level at the power input 112.

If external electric power is present at block 300, control flows to block 302. At block 302, the electronic switch 104 is closed, which means that the battery 102 is electronically connected with the operational circuitry 108. As such, the battery 102 is available for use as backup power for the operational circuitry 108 in the event the external electric power is lost at the power input 112.

If external electric power is not present at block control flows to block 304 where the battery manager 106 checks one or more secondary criteria to support decision-making about the appropriate open or closes state for the switch 104. Block 308 represents secondary criteria that corresponds to external communications or inputs that signal the battery manager 106 to enter a "storage mode," as described above with reference to FIG. 2A. Block 310 represents secondary criteria that corresponds to internal conditions, such as computations or states, that signal the battery manager 106 to enter a "storage mode," as described above with reference to FIG. 2B. At block 306, the battery manager 106 determines whether any such conditions 308 or 310 have been satisfied. If all such applicable conditions are deemed satisfied at block 306, then control flows to block 312, where the battery manager 106 drives the control signal 110 to open the switch 104. This results in the battery 102 being electronically disconnected from the operational circuitry 108. With switch 104 opened, unnecessary drain on the battery 102 is avoided when the device 100 is not in operational use (e.g., stored in inventory, not being used during afterhours periods, etc.). If block 306 results in a determination that all applicable conditions are not deemed satisfied, then the process flows to block 302, where the switch 104 remains closed.

Table 1 below provides an example logical table for controlling the switch 104 when external electric power is not present at the input 112 and a secondary criterion regarding an external command/input to enter storage mode has been received.

TABLE 1

| Primary Criterion (External electric power Present?) | Secondary Criterion (External Command/Input Received to Power Down the Device?) | Switch State |
| --- | --- | --- |
| No | No | Closed |
| No | Yes | Open |

As show in Table 1, when no external command/input has been received to power down the device 100, the switch 104 remains closed to provide backup power to the operational circuitry 108 even while no external electric power is received at the input 112. On the other hand, when an external command/input to power down the device 100 has been received, such as to place the device into storage, the switch 104 is opened to prevent the operational circuitry 108 from draining the battery 102 while the device is powered down.

Table 2 below provides an example logical table for controlling the switch 104 when external electric power is not present at the input 112 and two secondary criteria regarding an external command input to power down the device has been received and the battery charge level is below the charge threshold.

TABLE 2

| Primary Criterion (External electric power Present?) | Secondary Criterion 1 (External Command/ Input Received to Power Down the Device?) | Secondary Criterion 2 (Battery Charge Level < Charge Threshold?) | Switch State |
| --- | --- | --- | --- |
| No | No | No | Closed |
| No | No | Yes | Open |
| No | Yes | No | Closed |
| No | Yes | Yes | Open |

As show in Table 2, the first row represents the case when no external command/input to power down the device 100 has been received and the battery charge level is greater than the defined charge threshold, the switch 104 remains closed to provide backup power to the operational circuitry 108. The second row represents that case when no external command/input to power down the device 100 has been received and the battery charge level is below the charge threshold, the switch 104 is opened to prevent the operational circuitry 108 from draining the battery 102 while external electric power is lost. The last two rows represent the cases when the external command/input to power down the device 100 is received. In the third row, when the battery charge level is above the charge threshold, the battery manager 106 keeps the switch 104 closed until the battery charge level has drained below the charge threshold. In the fourth row, when the battery charge level is below the charge threshold, the switch 104 is immediately opened. In another implementation, the state of the switch 104 is open to prevent the operational circuitry 108 from draining the battery 102 regardless of whether the battery charge level is above the charge threshold.

Table 3 below provides an example logical table for controlling the switch 104 when external electric power is lost at the power input 112 and two secondary criteria regarding an external command/input to power down the device has been received and period of power loss at the power input 112 is compared with a time limit.

TABLE 3

| Primary Criterion (External electric power Present?) | Secondary Criterion 1 (External Command/ Input Received to Power Down the Device?) | Secondary Criterion 2 (Exceed Time Limit?) | Switch State |
|---|---|---|---|
| No | No | No | Closed |
| No | No | Yes | Open |
| No | Yes | N/A | Open |
| No | Yes | N/A | Open |

As show in Table 3, the first row represents the case that when no external command/input to power down the device 100 has been received and the device has lost external electric power for less than the time limit, the switch 104 is closed, enabling the battery 102 to provide backup power to the operational circuitry 108. The second row represents the case that when no external command/input has been received to power down the device 100 and the device 100 has lost external electric power for longer than the time limit, the switch 104 is open to prevent the operational circuitry 108 from draining the battery 102. The last two rows represent cases when an external command/input has been received to power down the device 100. In these cases, the state of switch 104 is opened to prevent the operational circuitry 108 from draining the battery 102 while the device is powered down, regardless of whether the device 100 has lost external electric power for more than the time limit.

Figure 4A:
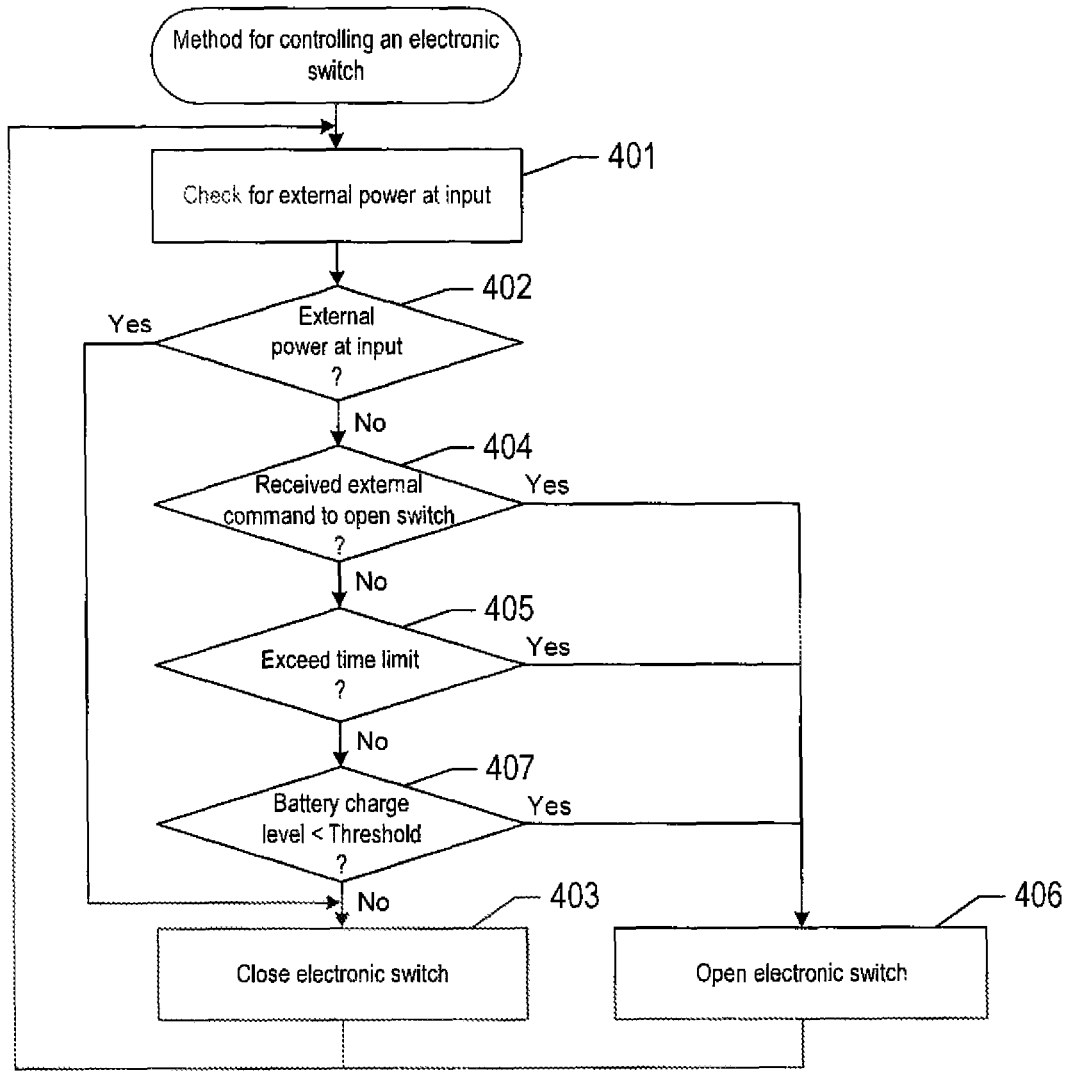
FIG. 4A is a flow diagram for controlling a switch using secondary criteria.

FIG. 4A is a flow diagram for controlling the switch 104 using three secondary criteria. In block 401, the battery manager 106 checks for external electric power received at external electric power input 112. In decision block 402, when the external electric power received at the input 112 exceeds a power level threshold, control flows to block 403. In block 403, the switch 104 is closed and the battery 102 provides backup power to the device operational circuitry 108. Otherwise, when no external electric power is received at the input 112 (e.g., the external electric power level is less than the power level threshold), control flows to decision block 404. In decision block 404, when an external command/input to power down the device 100 has been received, control flow to block 406. In block 406, the switch 104 is opened to prevent the device operational circuitry 108 from draining the battery 102. For example, the external common/input may be used to ready the device 100 for storage. Otherwise, control flow to decision block 405. In decision block 405, when the amount of time that external electric power has been lost to the device 100 is greater than the time limit, control flows to block 406 and the switch 104 is opened. Otherwise, when the amount of time that external electric power has been lost to the device 100 is less than the time limit, control flows to decision block 407. In decision block 407, when the battery charge level of battery 102 is less than the charge threshold, the switch 104 is opened. Otherwise, control flows to block 403 and the switch 104 is closed.

Figure 4B:
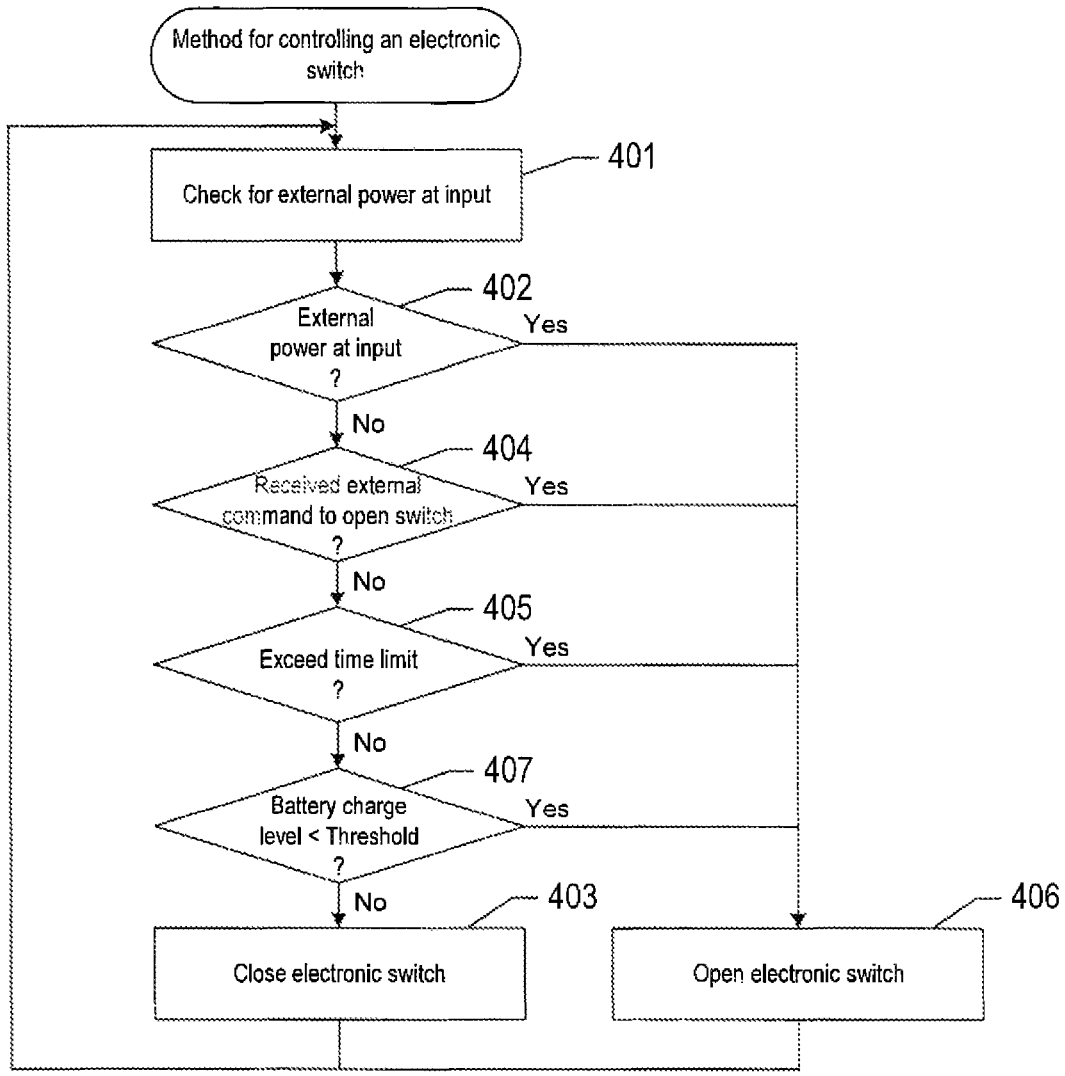
FIG. 4B is a flow diagram for controlling a switch using secondary criteria.

Note that while the examples discussed above describe implementations where the default state for the switch 104 is closed when external electric power is present, such as in FIG. 4A, in other implementations, the battery manager 106 maintains an open switch 104 when external electric power is present and closes the switch 104 when external electric power is lost and the secondary conditions are not satisfied. FIG. 4B is a flow diagram for controlling the switch 104 using three secondary criteria. The flow diagram includes the same primary and secondary criteria as described above with reference to FIG. 4A except in decision block 402 when the external electric power received at the input 112 exceeds a power level threshold, control flows to block 406, which opens the switch 104. Otherwise, when no external electric power is received at the input 112 (e.g., the external electric power level is less than the power level threshold), control flows to decision block 404 and the operations represented by decision blocks 404, 405, and 407 are performed as described above with to FIG. 4A. This approach could be beneficial for not only avoiding unnecessary battery drain when the device 100 is not being used for an extended period but can also help prolong battery life by keeping the battery 102 at a desired lower charge capacity during normal/powered operation for the device 100. With such an arrangement, a capacitor or other energy storage device may be included in the battery manager 106 to power the battery manager 106 for closing the switch 104 when external electric power is lost at the power input 112 and the secondary conditions are not satisfied.

Implementations are not limited to executing all three of the secondary criteria represented by decision blocks 404, 405, and 407 in FIGS. 4A-4B. In certain implementations, a method for controlling the switch 104 may be performed with only one or two of the secondary criteria represented by blocks 404, 405, and 407. For example, in one implementation, only one of the secondary criteria represented by blocks 404, 405, and 407 is used. In another implementation, only two of the secondary criteria represented by blocks 404, 405, and 407 is used. In other implementations, the secondary criteria represented by decision block 407 may be executed prior to execution of the secondary criteria represented by decision block 405.

In certain implementations, the battery manager 106 may implement the methods for controlling the battery 102 described above with reference to Tables 1, 2, and 2 and FIGS. 4A-4C in software or firmware.

Figure 5:
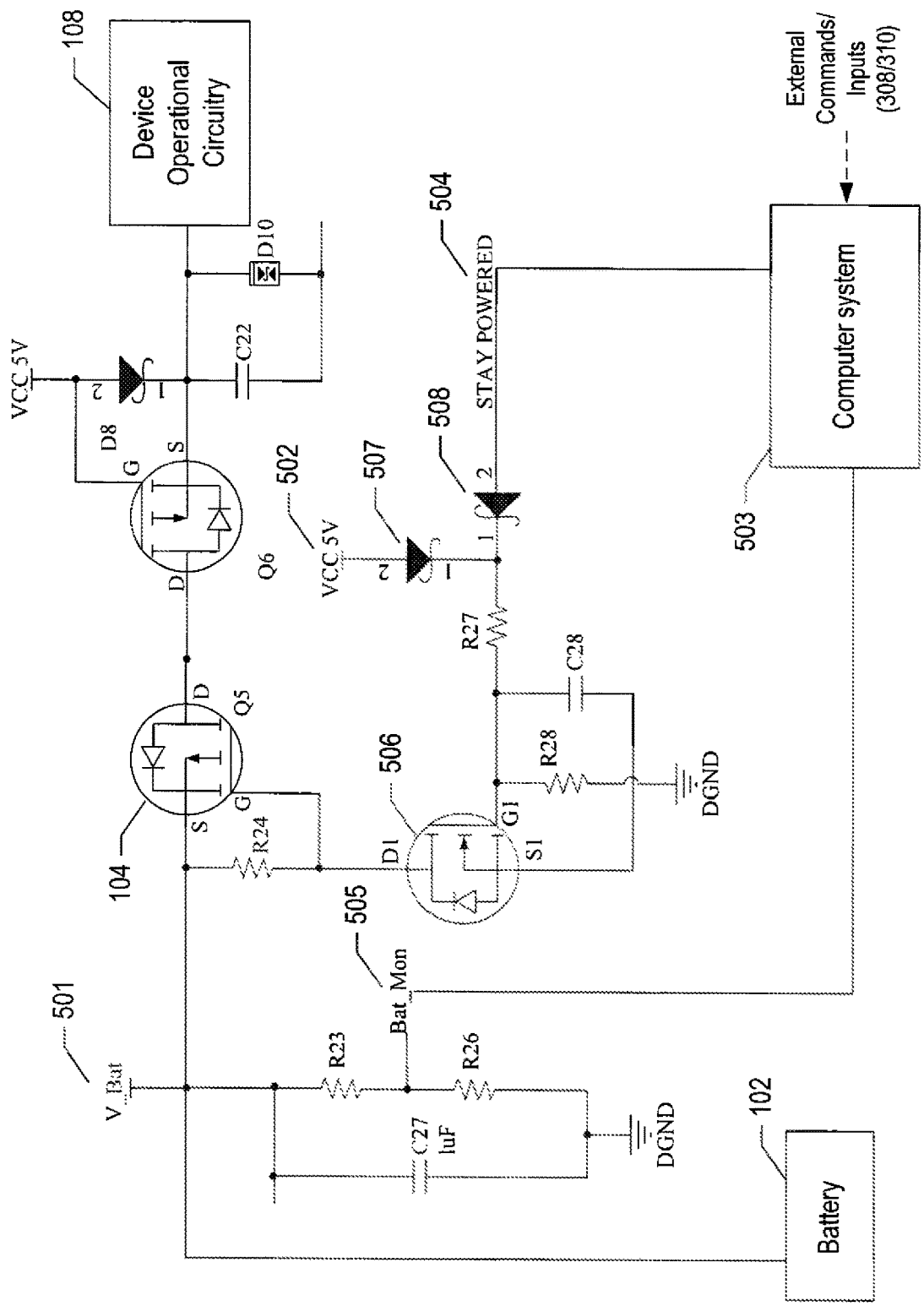
FIG. 5 shows an example battery manager.

FIG. 5 shows an example circuit that may be used to implement the switch 104 and the battery manager 106. Q5 is the switch 104. V_BAT 501 is a voltage that is available from the battery 102. The external electric power from the power input 112 is shown by VCC_5 V 502. In the example of FIG. 5, the battery manager 106 includes a computer system 503 that generates a STAY POWERED command 504 as a secondary criterion with respect to controlling the switch Q5 104. The STAY POWERED command 504 may be used to electronically connect the battery 102 to the operational circuitry 108 (i.e., close the switch 104). The STAY POWERED command 504 may be used to electronically disconnect the battery 102 from the device operational circuitry 108 (i.e., open the switch 104). Computer system 503 comprises a microprocessor and one or more data storage devices that execute the operations discussed herein in Tables 1, 2, and 3 and FIGS. 4A and 4B.

FIG. 5 also shows a "Bat_Mon" signal 505 that represents the battery charge level of the battery 102. The Bat_Mon signal 505 is sent to the computer system 503. When the secondary criterion represented by block 407 in FIGS. 4A and 4B is included in the method executed by the computer system 503, the charge level is compared with the charge threshold before opening or closing the switch Q5 104 as discussed above. For example, with reference to the example of Table 2 above, if the external electric power is lost at the power input 112, the external command/input is a command to enter a storage mode, and the monitored battery charge level is below a defined threshold, then the computer system 503 may drive the STAY POWERED command 504 to open the switch Q5 104.

FIG. 5 also shows a logic inverting FET Si 506 for controlling the gate of the switch Q5 104. The diodes 507 and 508 may be used to provide a hardwired "OR" logic function so that either the VCC_5 V 592 or the STAY POWERED command 504 can enable switch Q5 104.

Figure 6A:
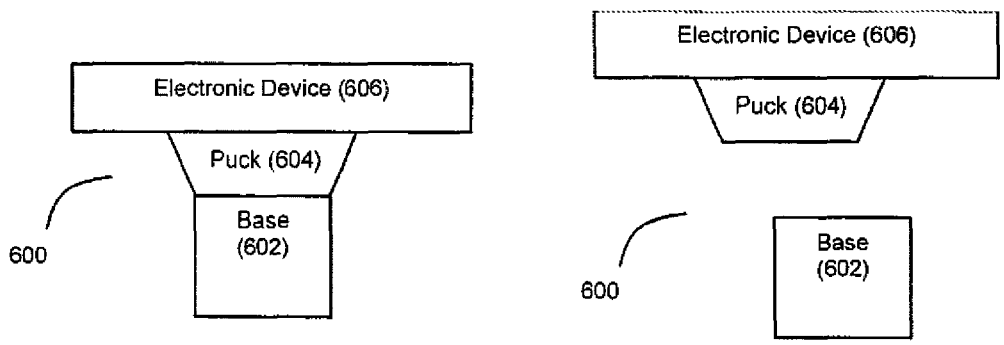
FIGS. 6A and 6B show examples of retail security positions.
Figure 6B:
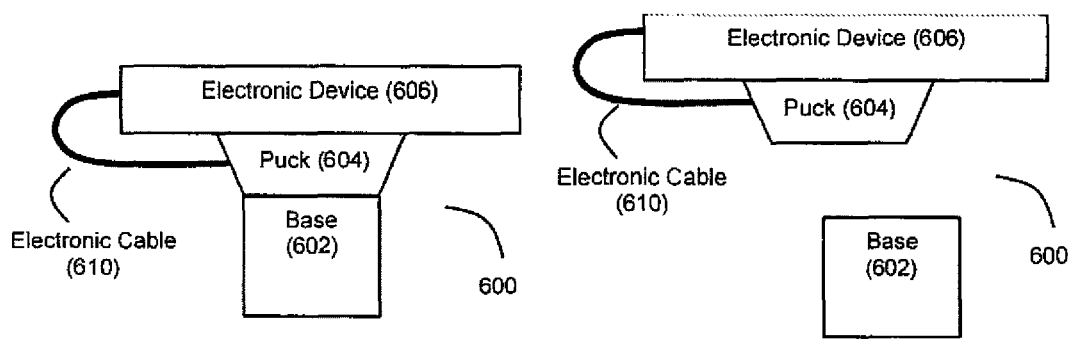
Figure 7:
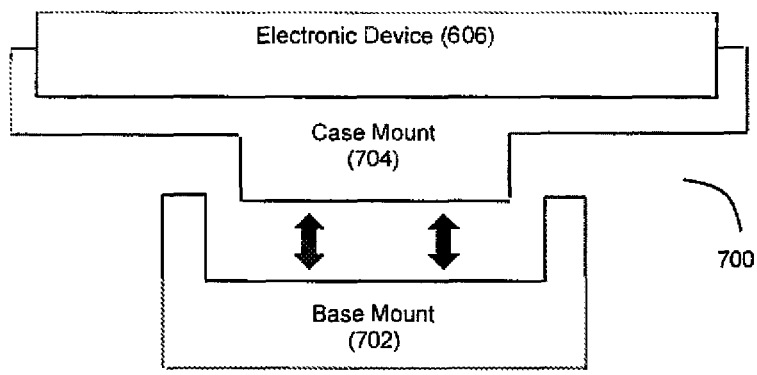
FIG. 7 shows an example docking system.

FIGS. 6A-6B and 7 show examples of different types of devices 100 that can employ the switch 104 and battery manager 106 to control battery usage as described above.

In the example of FIGS. 6A-6B, the device 100 can be a retail security device 600 that securely merchandises a product such as electronic device 606 to customers. The electronic device 606 may be cell phone, a tablet, laptop, or a camera. Such a retail security device 600 can be a product display assembly comprising a base assembly 602 and a puck 604 that rests on the base assembly 602. The puck 604 can be moved to a lift state where the puck 604 is separated from the base assembly 602 as shown in FIGS. 6A and 6B. When the puck 604 is resting on the base assembly 602, the base assembly 602 can pass power to the puck 604. Such power can come from an external electric power source (e.g., by plugging the base assembly 602 into a wall outlet either directly or indirectly via a power adapter). Electronic device 606 may be mounted on the puck 604. The puck 604 and/or base assembly 602 may include security circuitry that will trigger an alarm in response to an unauthorized removal of the electronic device 606 from the puck 604 and/or other unauthorized interference with the device 600. Device 600 may also include a tether that fastens the puck 604 to the base assembly while still allowing the puck 604 to be lifted by a customer who may want to interact with the electronic device 606 while evaluating it for potential purchase. The device 600 may also include an electronic cable 610 that electronically connects the electronic device 606 with the puck 604 as shown by FIG. 6B. The cable 610 allows power to pass from the puck 604 to the electronic device 606. Furthermore, data about the electronic device 606 can be passed to the puck 604 via the cable 610.

For example, the puck 604 may include an internal battery that can serve as battery 102. The puck 604 can also include device operational circuitry 108 that performs security operations, such as triggering an alarm when there is an unauthorized removal of the electronic device 606 from the puck 604, triggering an alarm when the cable 610 is cut or disconnected in an unauthorized manner, and triggering an alarm when the puck 604 is otherwise tampered with. The operational circuitry 108 located in the puck 604 may also include network connectivity circuitry that allows the puck 604 to wirelessly communicate with a remote computer system. By embedding the switch 104 and battery manager 106 in the puck 604, the device 600 can exhibit a longer and healthier life for the internal battery of the puck 604.

As another implementation, the include switch 104 and battery manager 106 may be embedded in the base assembly 602. The base assembly 602 may also include an internal battery 102 for backup purposes. The base assembly 602 can also include device operational circuitry 108 such as security circuitry for security operations performed by the base assembly 604, such as triggering an alarm when there is an unauthorized disconnection from the puck 604 (e.g., cutting the tether) or triggering an alarm when the base assembly is otherwise tampered with. The operational circuitry 108 of the base assembly 602 may include network connectivity circuitry that allows the base assembly 602 to wirelessly communicate with a remote computer system. As another example, the operational circuitry 108 may include power transfer circuitry for passing power from the base assembly 602 to the puck 604. By adding the switch 104 and the battery manager 106 to the base assembly 602, the battery 102 of the device 600 can exhibit a longer and healthier life.

In the example of FIG. 7, the device 100 can be a docking system 700 for an electronic device 606. The docking system 700 may include a base mount 702 that serves as a base for the docking system 700 and a case mount 704 that connects with and/or encloses or frames the electronic device 606. Case mount 704 can be releasably docked with the base mount 702 by a user. When docked, the base mount 702 can pass power to the case mount 704. Such power can come from an external electric power source (e.g., by plugging the base mount 702 into a wall outlet either directly or indirectly via a power adapter). Data can also be passed between the base mount 702 and case mount 704 if desired (e.g., via contacts that provide a communication path when the case mount 704 is docked with base mount 702. The case mount 704 and/or base mount 702 may include security circuitry that will trigger an alarm in response to an unauthorized removal of the electronic device 606 from the case mount 704 and/or other unauthorized interference with the docking system 700.

For example, the base mount 702 may include an internal battery that can serve as battery 102. The base mount 702 can also include operational circuitry 108 such as security circuitry for security operations by the base mount 702 that triggers an alarm when there is an unauthorized removal of the case mount 704 from the base mount 702. The operational circuitry 108 located in the base mount 702 may include signal processing circuitry for processing signals going to or coming from the case mount 704 and or network connectivity circuitry that allows the base mount 702 to wirelessly communicate with a remote computer system. As another example, the operational circuitry 108 located in the base mount 702 may include power transfer circuitry for passing power from the base mount 702 to the case mount 704. By adding the switch 104 and the battery manager 106 to the base mount 702, the internal battery of the docking system 700 can exhibit a longer and healthier life.

As another example, the switch 104 and the battery manager 106 may be implemented in the case mount 704. Case mount 704 may also include an internal battery for backup purposes. The case mount 704 can also include operational circuitry 108 such as security circuitry for security operations by the case mount 704 that triggers an alarm when there is an unauthorized disconnection or removal of the electronic device 606 from the case mount 704. The case mount's operational circuitry 108 may also include signal processing circuitry for processing signals going to or coming from the base mount 704 and/or electronic device 606 and/or network connectivity circuitry that allows the case mount 704 to wirelessly communicate with a remote computer system. By adding switch 104 and battery manager 106 to the case mount 704, the internal battery of the case mount 704 can exhibit a longer and healthier life.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A device comprising:
a battery;
operational circuitry that performs one or more device functions that rely on electrical power;
an electronic switch located between the battery and the operational circuitry and is opened to disconnect the battery from the operational circuitry and is closed to connect the operational circuitry to the battery; and
a battery manager in electronic communication with the electronic switch, wherein the battery manager is a circuit that closes the electronic switch when external electrical power is present at a power input, closes the electronic switch when the external power is not present at the power input and one or more of a battery charge level is greater than a charge threshold and an amount of time the external electric power is not available to the operational circuitry does not exceed a time limit, and opens the electronic switch when the external electrical power is not present at the power input and one or more of the battery charge level is less than the charge threshold and an amount of time the external electric power is not available to the operational circuitry exceeds the time limit.

2. The device of claim 1 further comprising a power input that receives the external electrical power from an external electric power source and is connected to the operational circuitry.

3. The device of claim 1 wherein the battery manager closes the electronic switch in response to external electrical power being available to operate the operational circuitry.

4. The device of claim 1 wherein the battery manager opens the electronic switch in response to a battery charge level of the battery is greater than a charge threshold.

5. A retail security system for securely merchandising a product to customers, the system comprising:
a power input that receives electrical power from an external electric power source;
operational circuitry that performs security functions that rely on electrical power;
an electronic switch located between the battery and the operational circuitry; and
a battery manager in electronic communication with the electronic switch, wherein the battery manager is a circuit that closes the electronic switch when external electrical power is present at a power input, closes the electronic switch when the external power is not present at the power input and one or more of a battery charge level is greater than a charge threshold and an amount of time the external electric power is not available to the operational circuitry does not exceed a time limit, and opens the electronic switch when the external electrical power is not present at the power input and one or more of the battery charge level is less than the charge threshold and an amount of time the external electric power is not available to the operational circuitry exceeds the time limit.

6. The retail security system of claim 5 wherein the battery manager opens the electronic switch in response to receiving a storage command from an external source.

7. The retail security system of claim 5 wherein the battery manager determines a battery charge level of the battery and opens the electronic switch in response to a battery charge level being less than a charge threshold.

8. The retail security system of claim 5 wherein the battery manager determines a period since electrical power is lost at the power input and opens the electrical switch in response to the period being greater than a time limit.

9. The retail security system of claim 5 further comprising:
a puck that is connectable to the product; and
a base assembly on which the puck can be placed, wherein the base assembly includes the power input, the operational circuitry, the electronic switch, and the battery manager.

10. The retail security system of claim 5 further comprising:
a puck that is connectable to the product; and
a base assembly on which the puck can be placed, wherein the puck includes the operational circuitry, the electronic switch, and the battery manager and the base assembly includes the power input.

11. A docking system for a portable computing device, the docking system comprising:
a power input that receives electrical power from an external electric power source;
a battery;
operational circuitry that performs security functions that rely on electrical power;
an electronic switch located between the battery and the operational circuitry and is opened to disconnect the battery from the operational circuitry and is closed to connect the operational circuitry to the battery; and
a battery manager in electronic communication with the electronic switch, wherein the battery manager is a circuit that closes the electronic switch when external electrical power is present at a power input, closes the electronic switch when the external power is not present at the power input and one or more of a battery charge level is greater than a charge threshold and an amount of time the external electric power is not available to the operational circuitry does not exceed a time limit, and opens the electronic switch when the external electrical power is not present at the power input and one or more of the battery charge level is less than the charge threshold, and an amount of time the external electric power is not available to the operational circuitry exceeds the time limit.

12. The docking system of claim 11 wherein the battery manager opens the electronic switch in response to receiving a storage command from an external source.

13. The docking system of claim 11 further comprising:
a case mount that is connectable to the portable computing device; and
a base mount that is dockable with the case mount, wherein the base mount includes the power input, the operational circuitry, the electronic switch, and the battery manager.

14. The docking system of claim 11 further comprising:
a ease mount that is connectable to the portable computing device, wherein the case mount includes the battery, the operational circuitry, and the battery manager; and
a base mount that is dockable with the case mount.

15. A method for controlling a battery of an electronic device, the battery connected to operational circuitry of the device via an electronic switch, the method comprising:
checking for external electrical power at a power input of the device;
closing the electronic switch to electronically connect the operational circuitry with the battery when external electrical power being present at the power input;
closing the electronic switch when the external power is not present at the power input and one or more of a battery charge level is greater than a charge threshold and an amount of time the external electric power is not available to the operational circuitry does not exceed a time limit; and opening the electronic switch when the external electrical power is not present at the power input and one or more of the battery charge level is less than the charge threshold and an amount of time the external electric power is not available to the operational circuitry exceeds the time limit.

16. The method of claim 15 wherein closing the electronic switch while a period of time since the external electric power is not available to the operational circuitry is less than a time limit.

17. The method of claim 15 further comprising closing the electronic switch while a period of time since the external electric power is not available to the operational circuitry is less than a time limit and while a battery charge level of the battery is greater than the charge threshold.

* * * * *